(12) United States Patent
Matsumoto et al.

(10) Patent No.: US 7,136,225 B2
(45) Date of Patent: Nov. 14, 2006

(54) POLARIZING PLATE AND METHOD FOR PRODUCING THE SAME

(75) Inventors: Koji Matsumoto, Niihama (JP);
Narutoshi Hayashi, Niihama (JP);
Tomoo Ueta, Ayauta-gun (JP)

(73) Assignees: Sumitomo Chemical Company, Limited, Osaka (JP); Okura Industrial Co., Ltd., Kagawa (JP)

(*) Notice: Subject to any disclaimer, the term of this patent is extended or adjusted under 35 U.S.C. 154(b) by 465 days.

(21) Appl. No.: 10/140,218

(22) Filed: May 8, 2002

(65) Prior Publication Data
US 2003/0030906 A1 Feb. 13, 2003

(30) Foreign Application Priority Data
May 10, 2001 (JP) .............................. 2001-139814

(51) Int. Cl.
*G02B 27/28* (2006.01)
*G02B 5/30* (2006.01)
*B05D 5/06* (2006.01)
*B32B 27/00* (2006.01)

(52) U.S. Cl. ...................... 359/491; 359/490; 359/492; 427/163.1; 427/162

(58) Field of Classification Search ................ 359/483, 359/488, 490, 491, 492; 427/162, 163.1; 260/25; 428/515
See application file for complete search history.

(56) References Cited

U.S. PATENT DOCUMENTS

| 2,328,219 A | * | 8/1943 | Land ......................... 359/491 |
| 3,058,862 A | * | 10/1962 | Nagano et al. ............. 428/515 |
| 4,166,871 A | | 9/1979 | Schuler |
| 4,591,512 A | | 5/1986 | Racich et al. |

FOREIGN PATENT DOCUMENTS

| JP | 62-240905 A | | 10/1987 |
| JP | 405241022 A | * | 9/1993 |
| JP | 07-134212 A | | 5/1995 |
| JP | 7-134212 A | | 5/1995 |
| JP | 08-21913 A | | 1/1996 |
| JP | 09-159829 A | | 6/1997 |
| JP | 9-325214 A | | 12/1997 |
| JP | 2000-35512 A | | 2/2000 |

* cited by examiner

*Primary Examiner*—Audrey Chang
(74) *Attorney, Agent, or Firm*—Sughrue Mion, PLLC

(57) ABSTRACT

An iodine type polarizing plate is provided, the plate having a polyvinyl alcohol resin film in/on which iodine is adsorbed and oriented and a protective film adhered to at least one surface of the resin film with a transparent adhesive layer containing zinc in an amount of about 30 mg to about 90 mg per one square meter of the polarizing plate or in an amount of about 6% to about 18% by weight based on the weight of the adhesive layer.

11 Claims, 1 Drawing Sheet

POLARIZING PLATE AND METHOD FOR PRODUCING THE SAME

FIELD OF THE INVENTION

The present invention relates to a polarizing plate in/on which iodine is adsorbed and oriented, and a method for producing such a polarizing plate. In particular, the present invention relates to a polarizing plate comprising a so-called iodine type polarizing film which comprises a polyvinyl alcohol resin film and iodine adsorbed and oriented therein/thereon.

RELATED ART TO THE INVENTION

Recently, an iodine type polarizing plate or a dye type polarizing plate, each of which comprises an iodine type film or a dye type film as a polarizer and a protective film adhered to at least one surface of the polarizer with an adhesive layer therebetween, is generally used. For example, the iodine type film comprises a polyvinyl alcohol resin film and iodine which is adsorbed and oriented in/on the film, and the dye type film comprises a polyvinyl alcohol resin film and a dichroic dye which is adsorbed and oriented in/on the film. The protective film may be a film of triacetylcellulose. Among these polarizing plates, the iodine type polarizing plate is widely used since it has a higher light transmittance and a higher degree of polarization, that is, a better contrast than the dye type polarizing plate. However, the iodine type polarizing plate has inferior optical durability to the dye type polarizing plate, although the former has the better optical characteristics than the latter. For example, when the iodine type polarizing plate is kept standing under dry heating conditions, it suffers from some problems such as the decrease of light transmission, the discoloration of the polarizing plate, etc.

JP-B-60-33245 discloses a method for treating a polyvinyl alcohol film in/on which iodine is adsorbed and oriented with an aqueous solution of boric acid containing zinc ions together with potassium iodide. In this method, the polarizing film is treated with the aqueous solution of boric acid containing the zinc ions after the dyeing of the film with iodine so as to provide zinc in the polyvinyl alcohol polarizer dyed with iodine. Such a method is effective to improve the drawbacks of the film after being kept standing under the dry heating conditions, but it requires the addition of a zinc salt such as zinc chloride to a boric acid treating liquid, and it is troublesome to control the concentration of the zinc salt. Thus, such a method should be further improved from the economical viewpoint.

SUMMARY OF THE INVENTION

One object of the present invention is to provide an iodine type polarizing plate with improved durability, which does not require the use of a boric acid treating liquid containing a zinc salt.

Another object of the present invention is to provide a method for producing such an iodine type polarizing plate.

The present invention provides an iodine type polarizing plate comprising a polyvinyl alcohol resin film in/on which iodine is adsorbed and oriented and a protective film adhered to at least one surface of the resin film with a transparent adhesive layer containing zinc in an amount of about 30 mg to about 90 mg per one square meter ($m^2$) of the polarizing plate.

Also, the present invention provides an iodine type polarizing plate comprising a polyvinyl alcohol resin film in/on which iodine is adsorbed and oriented and a protective film adhered to at least one surface of the resin film with a transparent adhesive layer containing zinc in an amount of about 6% to about 18% by weight based on the weight of the adhesive layer.

Moreover, the present invention provides a method for producing an iodine type polarizing plate comprising the steps of providing a polyvinyl alcohol resin film in/on which iodine is adsorbed and oriented and adhering a protective film to at least one surface of the resin film with a transparent adhesive containing zinc in an amount of about 6% to about 18% by weight based on the whole weight of the solids in the adhesive.

The present invention solves the above-mentioned problems such as discoloration of the polarizing plate under dry heating conditions and saves the troubles of controlling the concentration of the zinc salt in the treating liquid.

DETAILED DESCRIPTION OF THE INVENTION

Figure 1:
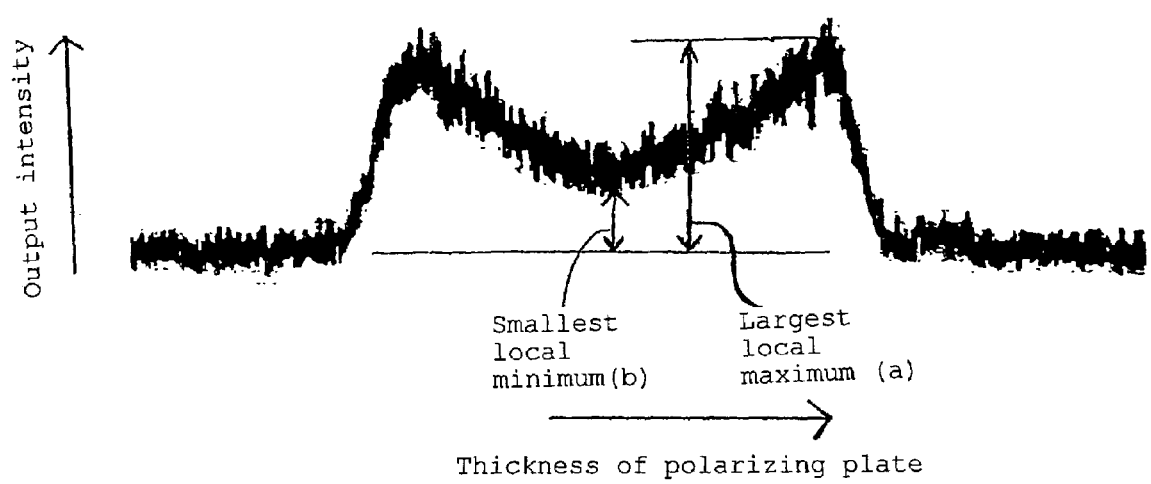
FIG. 1 is a typical example of a spectrum obtained when a zinc concentration distribution in the cross section of the polarizing plate is analyzed using an electron probe X-ray microanalyzer (EPMA).

The polarizing plate of the present invention comprises a polyvinyl alcohol resin film, which is uniaxially stretched and in/on which iodine is adsorbed and oriented, and a protective film adhered to at least one surface of the resin film with a transparent adhesive layer. In the present invention, the adhesive layer contains zinc, and the amount of zinc in the adhesive layer is from about 30 mg to about 90 mg per square meter of the polarizing plate from one point of view, or from about 6% to about 18% by weight based on the weight of the adhesive layer from another point of view.

In general, the polyvinyl alcohol resin constituting the polarizing film according to the present invention may be prepared by saponifying a polyvinyl acetate resin. Examples of the polyvinyl acetate resin include a homopolymer of vinyl acetate, that is, polyvinyl acetate, and copolymers of vinyl acetate and other monomer copolymerizable with vinyl acetate. Examples of the other monomer copolymerizable with vinyl acetate include unsaturated carboxylic acids (e.g. acrylic acid, methacrylic acid, ethyl acrylate, n-propyl acrylate, methyl methacrylate, etc.), olefins (e.g. ethylene, propylene, 1-butene, 2-methylpropylene, etc.), vinyl ethers (e.g. ethyl vinyl ether, methyl vinyl ether n-propyl vinyl ether, isopropyl vinyl ether, etc.), unsaturated sulfonic acids (e.g. vinylsulfonate, sodium vinylsulfonate, etc.) and the like.

The saponification degree of the polyvinyl alcohol resin may be from about 85% to about 100% by mole, preferably from about 98% to about 100% by mole.

The polyvinyl alcohol resin used according to the present invention may be further modified, and those modified with an aldehyde such as polyvinyl formal or polyvinyl acetal may be used.

The polyvinyl alcohol resin may have a polymerization degree of about 1,000 to about 10,000, preferably about 1,500 to about 10,000.

The iodine type polarizing plate of the present invention may be produced by a method comprising the steps of uniaxially stretching the polyvinyl alcohol resin film, dyeing the polyvinyl alcohol resin film with iodine to adsorb iodine in/on the film, treating the polyvinyl alcohol resin film in/on which iodine is adsorbed with an aqueous solution of boric acid, washing the film with water, and adhering a protective film to at least one surface of the polyvinyl alcohol resin film which has been processed in the previous steps.

The polyvinyl alcohol resin film maybe uniaxially stretched before, during or after dyeing with iodine. When the film is uniaxially stretched after dyeing with iodine, the uniaxial stretching may be carried out before or during the treatment with boric acid. The uniaxial stretching may be carried out in two or more of those steps.

The polyvinyl alcohol resin film maybe uniaxially stretched with rolls having different preferential speeds, or heated rolls. The stretching may be dry stretching carried out in an air, or wet stretching carried out while swelling the film with a solvent.

A stretch ratio may be from about 4 times to about 8 times.

Iodine may be adsorbed and oriented in/on the polyvinyl alcohol resin film by dipping the resin film in an aqueous solution containing iodine and potassium iodide to dye the film with iodine. The amount of iodine in the aqueous solution may be from about 0.01 to about 0.5 part by weight, preferably from about 0.02 to about 0.1 part by weight, per 100 parts by weight of water, and the amount of potassium iodide may be from about 0.5 to about 10 parts by weight, preferably from about 1 to about 8 parts by weight, per 100 parts by weight of water.

The temperature of the aqueous solution may be from about 20° C. to about 40° C., preferably from about 25° C. to about 35° C. The dipping time of the film in the aqueous solution may be from about 30 to about 300 seconds, preferably from about 40 to about 200 seconds.

The polyvinyl alcohol resin film dyed with iodine may be then treated with boric acid by dipping the resin film in an aqueous solution of boric acid. The amount of boric acid in the aqueous solution may be from about 2 to about 15 parts by weight, preferably from about 5 to about 12 parts by weight, per 100 parts by weight of water. Preferably, the aqueous solution of boric acid contains potassium iodide. The amount of potassium iodide is preferably from about 1 to about 20 parts by weight, more preferably from about 2 to about 15 parts by weight, per 100 parts by weight of water.

The dipping time of the resin film in the aqueous solution of boric acid may be from about 100 to about 1,200 seconds, preferably from about 150 to about 600 seconds, more preferably from about 200 to about 400 seconds.

After being dipped in the aqueous solution of boric acid, the polyvinyl alcohol resin film may be washed with water, for example, by dipping the resin film in water. After being washed with water, the resin film may be dried to obtain the polyvinyl alcohol resin film in/on which iodine is adsorbed and oriented, that is, the iodine type polarizing film.

In the present invention, then, a protective film is laminated on at least one surface of the polarizing film obtained by the above steps to obtain the polarizing plate. Examples of the protective film include films of cellulose acetates (e.g. triacetylcellulose, diacetylcellulose, etc.), acrylic resin films, polyester resin films, polyarylate resin films, polyether sulfone resin films, cyclic polyolefin film resins (e.g. polynorbornene resin films, etc.), and the like.

The thickness of the protective film may be from about 30 μm to about 200 μm, preferably from about 35 μm to about 150 μm.

To laminate the protective film on the polarizing film, an optically isotropic transparent adhesive may be used. According to the present invention, the adhesive contains zinc so that about 30 mg to about 90 mg, preferably about 40 mg to about 85 mg of zinc can be present per square meter ($mg/m^2$) of the polarizing plate. When the protective films are adhered to the both surfaces of the polarizing plate, the amount of zinc is the total amount of zinc contained in the both adhesive layers.

When a zinc concentration distribution in the cross section of the polarizing plate is analyzed using an electron probe X-ray microanalyzer (EPMA), an output peak indicating the presence of zinc appears in the spectrum near the interfacial region between the protective film and the polyvinyl alcohol resin film (see FIG. 1). With the polarizing plate of the present invention, when the zinc concentration distribution in the cross section of the polarizing plate is analyzed using an electron probe X-ray microanalyzer with a beam diameter of 1 μm, and the smallest local minimum (b) and the largest local maximum (a) of spectrum intensities are measured using an intensity corresponding to the protective film region as a datum (base) value, a ratio (a/b) of the largest local maximum (a) to the smallest local minimum (b) is preferably at least 1.5, more preferably at least 2. When the ratio a/b is in this range, the change of color hue of the adhesive can be suppressed.

The amount of zinc contained in the adhesive is preferably from about 6% to about 18% by weight, more preferably about 8% to about 17% based on the whole weight of the solids in the adhesive.

When the amount of zinc is less than the above lower limit, the discoloration of the polarized film under dry heating conditions may not be effectively prevented. When the amount of zinc exceeds the above upper limit, the adhesive layer may become brittle so that the polarizing film and the protective film may be delaminated.

Non-limiting examples of the transparent adhesive include polyvinyl alcohol adhesives, acrylic adhesives, polyurethane adhesives, etc. The polyvinyl alcohol adhesives, which are particularly preferable among those adhesives, may be a partially or completely saponified polyvinyl alcohol, or an aqueous solution of a modified polyvinyl alcohol such as acetoacetyl group-modified polyvinyl alcohol, carboxyl group-modified polyvinyl alcohol, etc. The adhesive may optionally contain a crosslinking agent such as a water-soluble epoxy compound, a dialdehyde, an isocyanate, etc. The adhesive may be an emulsion type adhesive. As a solvent for the adhesive, water is preferable, while the water may optionally contain a small amount of a hydrophilic organic solvent such as alcohol.

The simplest method for adding zinc to the adhesive comprises adding a water-soluble zinc salt to the adhesive to obtain the zinc-containing adhesive. Examples of the water-soluble zinc salt are inorganic salts of zinc such as zinc halides (e.g. zinc chloride, etc.), zinc sulfate, zinc nitrate, and the like. Among them, zinc chloride is most preferable. Furthermore, a salt of a zinc complex or a solution of a zinc complex may be added to the adhesive.

After the lamination of the polarizing film to the protective film with the adhesive, the laminate may be dried to remove the solvent and the polarizing plate is finally obtained. The laminate may be dried with hot air at a temperature of about 40° C. to about 100° C., preferably about 45° C. to about 90° C. The drying time may be from about 20 to about 1,200 seconds. The thickness of the adhesive layer after drying may be from about 0.01 μm to about 4 μm, preferably from about 0.05 μm to about 2 μm.

In the polarizing plate of the present invention, zinc may be contained in the adhesive layer and optionally in other layer. For example, the polarizing film may comprise the polyvinyl alcohol resin containing a small amount of zinc and the protective film adhered thereto with the adhesive containing zinc. Advantageously, the whole amount of zinc contained in the polarizing plate corresponds to the amount of zinc contained in the adhesive in view of the troublesome control of the concentration of the boric acid-treating liquid used after dyeing with iodine.

The polarizing plate of the present invention may have a hard coat layer, an antireflection layer, an anti-glaring layer, etc., for example, on its surface(s). Also, a self-adhesive layer may be provided on at least one surface of the polarizing plate.

EXAMPLES

The present invention will be illustrated by the following examples, which do not limit the scope of the invention in any way. In the examples, "%" used to express the content or the amount of a material is "% by weight", unless otherwise indicated.

A zinc concentration distribution in a cross section of a polarizing plate was analyzed using an electron probe X-ray microanalyzer EPM-810 manufactured by Shimadzu Corporation under the following measuring conditions:

| | |
|---|---|
| Acceleration voltage: | 15 kV |
| Sample absorption current: | 0.05 µA |
| Beam diameter: | 1 µm |
| Sample traveling rate: | 3 µm/min. |
| Chart forwarding rate: | 1 cm/min. |
| Scanning distance: | 100 µm |
| Spectral crystal: | Kα2-PET |

Example 1

A polyvinyl alcohol film having an average polymerization degree of 2,400, a saponification degree of 99.9% by mole or more and a thickness of 75 µm was uniaxially stretched in a dry state at a stretch ratio of 5, and was dipped in an aqueous solution having a weight ratio of iodine:potassium iodide:water of 0.05:5:100 at 28° C. for 60 seconds while maintaining the stretched state of the film. Then, the film was dipped in an aqueous solution having a weight ratio of potassium iodide:boric acid:water of 10:9.5:100 at 74° C. for 300 seconds. Thereafter, the film was washed with pure water at 26° C. for 20 seconds, and then was dried at 65° C. to obtain a polyvinyl alcohol based polarizing film having a thickness of about 26 µm.

Separately, an amount of zinc chloride was added to an aqueous solution of polyvinyl alcohol having an average polymerization degree of about 1,700 and a saponification degree of 99.6% or more to obtain an adhesive containing polyvinyl alcohol, water and zinc chloride in a weight ratio of 4:100:1.5. The content of zinc in this adhesive was about 13% based on the whole weight of the solids in the adhesive.

This adhesive was applied to the both surfaces of the polarizing film prepared in the previous steps, and then protective films of triacetylcellulose each having a thickness of 80 µm, the surfaces of which were saponified ("FUJI-TACK T80UZ" available from Fuji Photo Film Co., Ltd.), were adhered to the respective surfaces of the polarizing film, followed by drying at 70° C. for 4 minutes to obtain a polarizing plate.

The polarizing plate was pretreated by decomposition with sulfuric acid, incineration and dissolving in nitric acid, and then was analyzed with the flame atomic absorption spectrometry. The content of zinc was 68 mg per square meter (g/m$^2$) of the plate.

The thickness of each adhesive layer could not be measured with a film thickness meter. Assuming from the content of zinc in the adhesive (about 13% by weight), the thickness of each adhesive layer was about 0.2 µm.

A pair of the thus obtained polarizing plates were maintained in a dry atmosphere at 80° C. for 500 hours. Then, the polarizing plates were superposed on one another so that the absorption axes of the plates were perpendicular to each other, and the color of transmitted light was observed on a lighting box using a fluorescent lamp. The result is shown in Table 1. Also, the ratio the largest local maximum (a) to the smallest local minimum (b) obtained by the analysis with EPMA is reported in Table 1.

Example 2

A polarizing plate was produced in the same manner as in Example 1 except that the composition of an adhesive was changed so that a weight ratio of polyvinyl alcohol:water:zinc chloride was 4:100:2, and thus the content of zinc in the adhesive was about 16%. The content of zinc in the polarizing plate and the results of the evaluation of the polarizing plate are shown in Table 1. Also, the ratio the largest local maximum (a) to the smallest local minimum (b) obtained by the analysis with EPMA is reported in Table 1.

Comparative Example 1

A polarizing plate was produced in the same manner as in Example 1 except that no zinc chloride was used. The results of the evaluation of the polarizing plate are shown in Table 1.

Comparative Example 2

A polarizing plate was produced in the same manner as in Example 1 except that the content of zinc in the adhesive was changed to about 5% based on the solid content of the adhesive. The content of zinc in the polarizing plate and the results of the evaluation of the polarizing plate are shown in Table 1. Also, the ratio the largest local maximum (a) to the smallest local minimum (b) obtained by the analysis with EPMA is reported in Table 1.

TABLE 1

| Example No. | Zinc content in adhesive (%) | Zinc content in polarizing plate (mg/m$^2$) | Before dry heating test | After heating at 80° C. for 500 hrs | a/b |
|---|---|---|---|---|---|
| Example 1 | 13 | 68 | Bluish black | Still bluish | 2.5 |
| Example 2 | 16 | 83 | Bluish black | Still bluish | 2.9 |
| Comp. Ex. 1 | — | — | Bluish black | Turning red | — |
| Comp. Ex. 2 | 5 | 26 | Bluish black | Turning red | 1.4 |

As can be seen from the results in Table 1, the iodine type polarizing plate of the present invention suffers from less deterioration after dry heating, and has good durability.

Thus, the present invention can improve the durability of the iodine type polarizing plate by a simpler method than conventional methods.

What is claimed is:

1. An iodine type polarizing plate comprising a polyvinyl alcohol resin film in/on which iodine is adsorbed and oriented and a protective film adhered to at least one surface of said resin film with a transparent adhesive layer containing zinc in an amount of about 30 mg to about 90 mg per one square meter of the polarizing plate.

2. The iodine type polarizing plate according to claim 1, wherein the protective films are adhered to the both surfaces of said resin film.

3. The iodine type polarizing plate according to claim 1, wherein said adhesive comprises polyvinyl alcohol.

4. The iodine type polarizing plate according to claim 1, wherein a whole amount of zinc contained in said polarizing plate corresponds to the amount of zinc contained in said adhesive.

5. The iodine type polarizing plate according to claim 1, wherein, when a zinc concentration distribution in a cross section of said polarizing plate is analyzed using an electron probe X-ray microanalyzer with a beam diameter of 1 μm and the smallest local minimum (b) and the largest local maximum (a) of spectrum intensities are measured using an intensity corresponding to the protective film region as a datum value, a ratio (a/b) of the largest local maximum (a) to the smallest local minimum (b) is at least 1.5.

6. An iodine type polarizing plate comprising a polyvinyl alcohol resin film on which iodine is adsorbed and oriented and a protective film adhered to at least one surface of said resin film with a transparent adhesive layer containing zinc in an amount of about 6% to about 18% by weight based on the weight of the adhesive layer.

7. The iodine type polarizing plate according to claim 6, wherein the protective films are adhered to the both surfaces of said resin film.

8. The iodine type polarizing plate according to claim 6, wherein said adhesive comprises polyvinyl alcohol.

9. The iodine type polarizing plate according to claim 6, wherein a whole amount of zinc contained in said polarizing plate corresponds to the amount of zinc contained in said adhesive.

10. The iodine type polarizing plate according to claim 6, wherein, when a zinc concentration distribution in a cross section of said polarizing plate is analyzed using an electron probe X-ray microanalyzer with a beam diameter of 1 μm and the smallest local minimum (b) and the largest local maximum (a) of spectrum intensities are measured using an intensity corresponding to the protective film region as a datum value, a ratio (a/b) of the largest local maximum (a) to the smallest local minimum (b) is at least 1.5.

11. A method for producing an iodine type polarizing plate comprising the steps of:
providing a polyvinyl alcohol resin film in/on which iodine is adsorbed and oriented and
adhering a protective film to at least one surface of said resin film with a transparent adhesive containing zinc in an amount of about 6% to about 18% by weight based on the whole weight of solids in the adhesive.

* * * * *